US011222288B2

(12) United States Patent
Baker (10) Patent No.: US 11,222,288 B2
(45) Date of Patent: Jan. 11, 2022

(54) BUILDING DEEP LEARNING ENSEMBLES WITH DIVERSE TARGETS (71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 17/268,660

(22) PCT Filed: Aug. 12, 2019

(86) PCT No.: PCT/US2019/046107
§ 371 (c)(1),
(2) Date: Feb. 16, 2021

(87) PCT Pub. No.: WO2020/036847
PCT Pub. Date: Feb. 20, 2020

(65) Prior Publication Data
US 2021/0174265 A1 Jun. 10, 2021

Related U.S. Application Data (60) Provisional application No. 62/719,433, filed on Aug. 17, 2018.

(51) Int. Cl.
*G06N 20/20* (2019.01)
*G06N 3/04* (2006.01)
(Continued)

(52) U.S. Cl.
CPC ............ *G06N 20/20* (2019.01); *G06N 3/0454* (2013.01); *G06N 3/0481* (2013.01); *G06N 3/063* (2013.01); *G06N 3/084* (2013.01)

(58) Field of Classification Search
CPC .......... G06N 20/00; G06N 20/20; G06N 3/02; G06N 3/0454; G06N 3/0481; G06N 3/063; G06N 3/084
See application file for complete search history.

(56) References Cited

U.S. PATENT DOCUMENTS

2008/0126273 A1* 5/2008 Carus ...................... G06F 16/36
706/12
2014/0279753 A1* 9/2014 Dalessandro ............ G06N 5/02
706/12
(Continued)

FOREIGN PATENT DOCUMENTS

WO 2018063840 A1 4/2018
WO 2020036847 A1 2/2020

OTHER PUBLICATIONS

Chandra, Arjun, and Xin Yao. "Ensemble learning using multi-objective evolutionary algorithms." Journal of Mathematical Modelling and Algorithms 5.4 (2006): 417-445. (Year: 2006).*

(Continued)

*Primary Examiner* — Kamran Afshar
*Assistant Examiner* — Randall K. Baldwin
(74) *Attorney, Agent, or Firm* — K&L Gates LLP (57) ABSTRACT A computer-implemented method of training an ensemble machine learning system comprising a plurality of ensemble members. The method includes selecting a shared objective and an objective for each of the ensemble members. The method further includes training each of the ensemble members according to each objective on a training data set, connecting an output of each of the ensemble members to a joint optimization machine learning system to form a consolidated machine learning system, and training the consolidated machine learning system according to the shared objective and the objective for each of the ensemble members on the training data set. The ensemble members can be the same or different types of machine learning systems. Further, the joint optimization machine learning system can be the same or a different type of machine learning system than the ensemble members.

30 Claims, 6 Drawing Sheets (51) Int. Cl.
*G06N 3/063* (2006.01)
*G06N 3/08* (2006.01)

(56) References Cited

U.S. PATENT DOCUMENTS

| | | | | |
|---|---|---|---|---|
| 2015/0356461 | A1* | 12/2015 | Vinyals | G06N 7/00 706/12 |
| 2016/0307098 | A1* | 10/2016 | Goel | G06N 3/0454 |
| 2017/0024642 | A1* | 1/2017 | Xiong | G06N 3/084 |
| 2017/0132528 | A1* | 5/2017 | Aslan | G06N 20/00 |
| 2018/0137155 | A1* | 5/2018 | Majumdar | G06F 16/28 |

OTHER PUBLICATIONS

Gu, Shenkai, Ran Cheng, and Yaochu Jin. "Multi-objective ensemble generation." (2015): 1-12 (Year: 2015).*

Zhang, Chong, Jia Hui Sun, and Kay Chen Tan. "Deep belief networks ensemble with multi-objective optimization for failure diagnosis." 2015 IEEE International Conference on Systems, Man, and Cybernetics. IEEE, 2015: 32-37 (Year: 2015).*

Meshgi, Kourosh, Shigeyuki Oba, and Shin Ishii. "Efficient diverse ensemble for discriminative co-tracking." Proceedings of the IEEE Conference on Computer Vision and Pattern Recognition. Jun. 2018: 4814-4823 (Year: 2018).*

Ba, Jimmy, and Brendan Frey. "Adaptive dropout for training deep neural networks." Advances in neural information processing systems 26 (2013): 3084-3092. (Year: 2013).*

International Search Report and Written Opinion for International PCT Application No. PCT/US2019/046107, dated Nov. 13, 2019.

* cited by examiner

BUILDING DEEP LEARNING ENSEMBLES WITH DIVERSE TARGETS

PRIORITY

The present application is a national stage application under 35 U.S.C. § 371 of PCT application Serial No. PCT/US2019/46107, filed Aug. 12, 2019, which claims priority to U.S. Provisional Patent Application Ser. No. 62/719,433, filed Aug. 17, 2018, having the same title and inventor as indicated above, and which are incorporated herein by reference.

BACKGROUND

In many machine learning tasks, an ensemble of machine learning systems performs better than an individual machine learning system. Furthermore, the performance of an ensemble tends to improve as the number of ensemble members is increased. The amount that performance may be increased is greater if the ensemble members are more diverse, that is, more different from each other in one or more of a variety of ways. However, as the number of ensemble members becomes larger, it is increasingly difficult to continue to achieve diversity and the incremental improvement from adding more ensemble members quickly declines.

SUMMARY

The present invention directly creates diversity by designing a training target for the output for each ensemble member as a function of the input that is distinct from the target for any other ensemble member. Remarkably, this aspect of the invention enables supervised training for diversity using unlabeled data. The invention then trains the ensemble as a whole to optimize an objective that may be unrelated to any of the objectives to which individual ensemble members have been trained. This whole-ensemble training is achieved by a joint optimization network that not only is trained to compute an optimum combination of the outputs of the individual ensemble members, but that also controls continued training of the ensemble members to mutually support each other to optimize their joint performance.

FIGURES

Various embodiments of the present invention are described herein by way of example in conjunction with the following figures.

DETAILED DESCRIPTION

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 1:
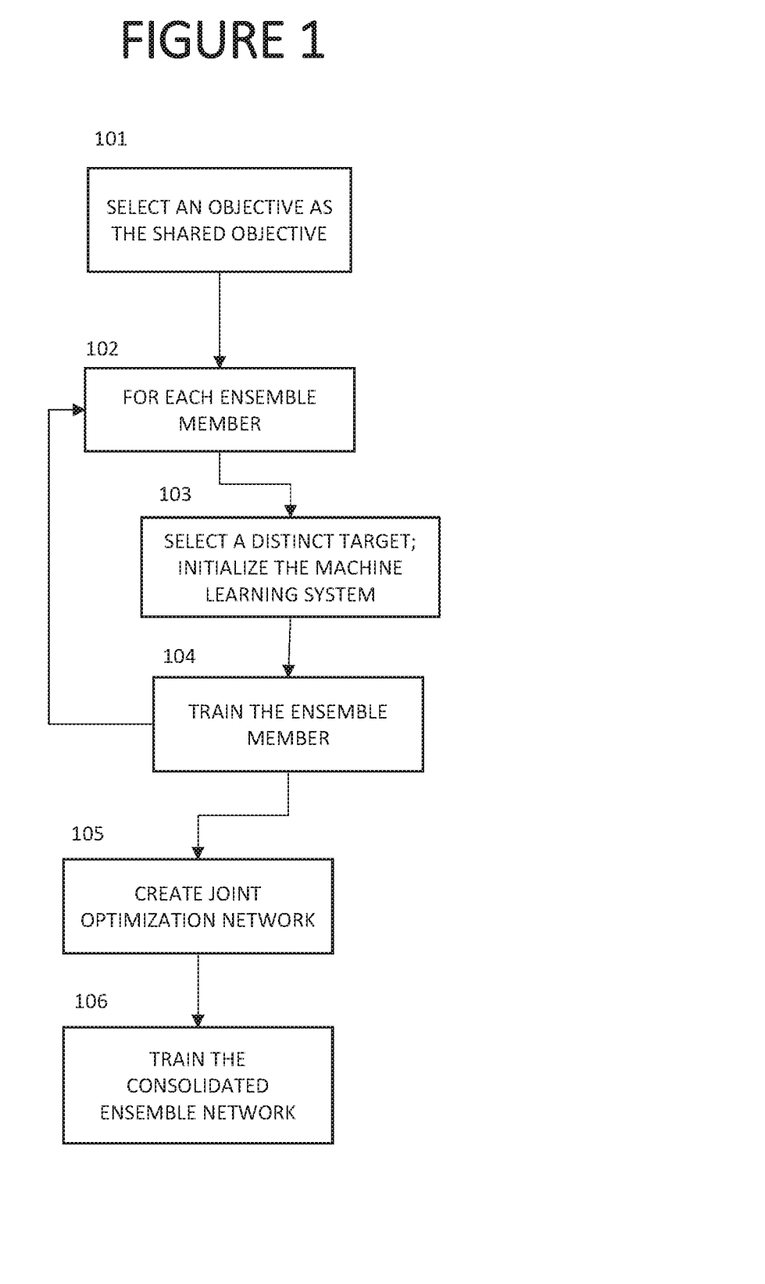
FIG. 1 is a flowchart of an illustrative embodiment of the invention.
Figure 3:
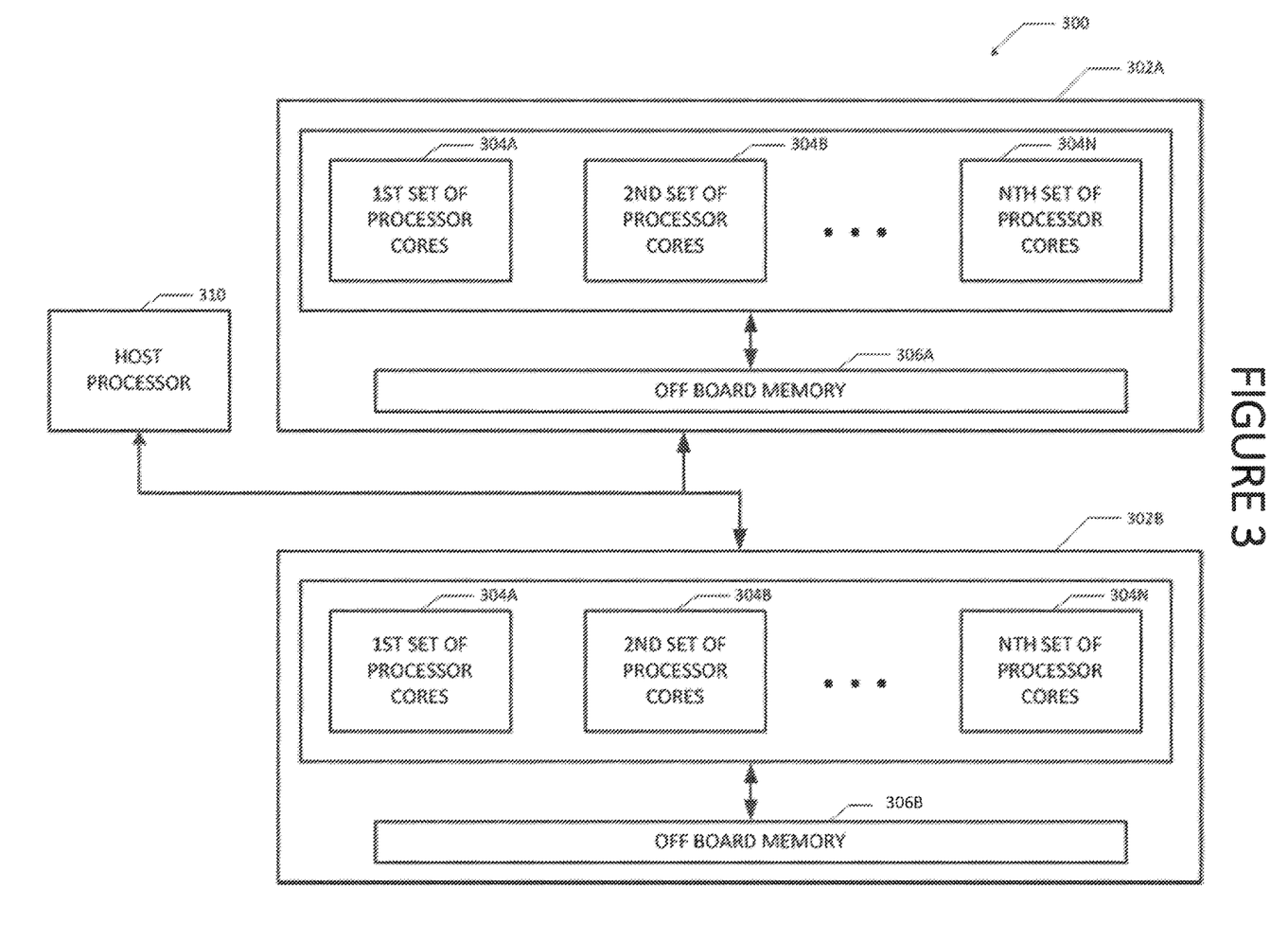
FIG. 3 is a system diagram of a computer system that may be used to implement various embodiments.

FIG. 1 is a flowchart of an illustrative process in which a computer system, such as the computer system 300 illustrated in FIG. 3, builds and trains an ensemble of machine learning systems. In a machine learning ensemble, each ensemble member can be a distinct machine learning system from the other ensemble members. Further, the outputs of the various ensemble members can be pooled or otherwise combined together in order to select one or more outputs to be provided by the ensemble (e.g., by voting).

In step 101, the computer system 300 selects an objective as the shared objective for the ensemble of machine learning systems, typically a supervised learning classification task. In machine learning, this selection of an objective is often taken for granted and not explicitly mentioned in descriptions of such ensemble-based machine learning systems. In the embodiment illustrated by FIG. 1, the selection of the shared objective is made explicit in step 101 because, in this illustrative embodiment, each ensemble member has its own individual objective in addition to the shared objective on the ensemble as a whole.

In step 102, the computer system 300 begins a loop that trains each ensemble member. The execution of steps 102 to 104 for each ensemble member may be executed sequentially or in parallel. An ensemble member may be any of many types of machine learning systems. Further, an ensemble may have multiple types of machine learning system among its ensemble members. In some embodiments, an ensemble member of the machine learning system can include a neural network, such as a feed-forward layered neural network.

Figure 2:
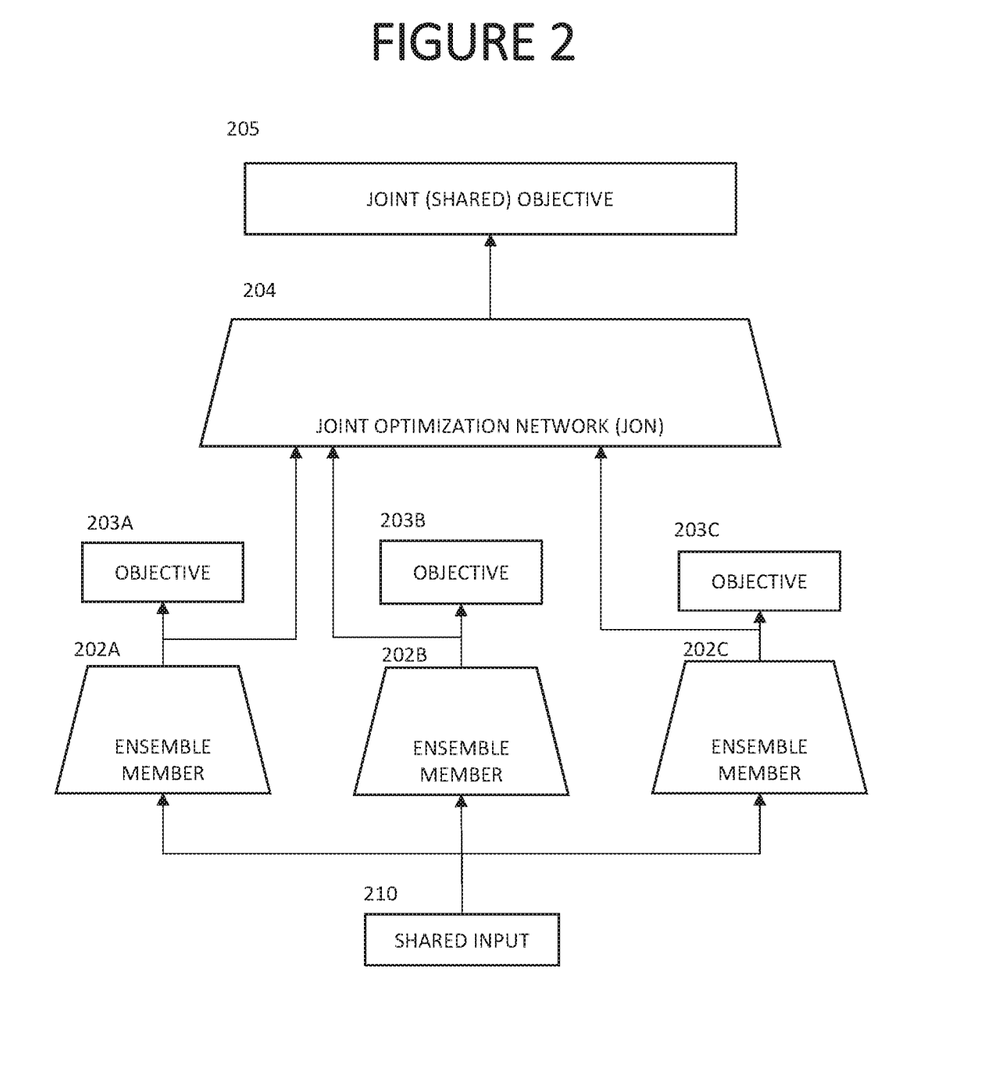
FIG. 2 is a system diagram of an aspect of the invention used in various embodiments.

In some embodiments, additional ensemble members may be added after an ensemble has been built and trained. In such embodiments, the computer system may train the added ensemble members by using the process of the loop from step 102 to step 104. In such an embodiment, the newly trained ensemble members are added to the previously trained ensemble members (e.g., ensemble members 202A, 202B, 202C in FIG. 2) and then connected to joint optimization network 204 (FIG. 2). Thereafter, the joint optimization training in step 106 (described below) is resumed with all the ensemble members, including the new ones.

In step 103, the computer system 300 selects a potentially unique objective for the ensemble member specified in step 102. In some embodiments a plurality of ensemble members may share an objective. However, in that case the ensemble members that share an objective may be combined into a single machine learning system. Thus, without loss of generality, the discussion assumes that each ensemble member receives a unique objective.

As an illustrative example, a unique objective may be specified for an ensemble member by selecting a unique subset of the training data items as the target for an output detector node. An output "detector" is an output node with a target that is defined by arbitrary subsets of the training data items, such as a division of the training data into two disjoint subsets, a "target" subset and a "non-target subset." The target output value for any data item in the target subset may be 1.0 and the target output value for any data item that is in the non-target subset may be 0.0. Thus, the total number of distinct objectives is $2^T/2$, where T is the number of training data items. Preferably, for this objective the output node activations are restricted to the interval [0, 1]. For such embodiments, the machine learning system can utilize the logistic or sigmoid activation function, which is restricted to (0, 1) and approaches 0 or 1 in the limit.

As another illustrative example, a unique objective may be specified for an ensemble member by selecting two disjoint subsets, referred to as a positive subset and a negative subset. Then, for example, the target value may be +1 for any data item in the positive subset, −1 for any data item in the negative subset, and 0 for any data item that is in neither selected subset. In this example, the total number of distinct objectives is $(3^T-1)/2$. Preferably, for this objective, the output node activations are restricted to the interval [−1, 1]. For such embodiments, the machine learning system can utilize the tanh(x) activation function, which is restricted to (−1, 1) and approaches −1 or 1 in the limit. In this discussion, an output node with a three-way positive/negative/neither target is also called a "detector" node.

Note that neither of the illustrative examples above require that the data items be labeled with any label other than the target sets, which are arbitrary. Each ensemble member is trained to its unique targeted objective with supervised training techniques based on the specified targets without requiring labeled data for some other objective, such as the shared objective for the ensemble (205 in FIG. 2). In many applications, the ability to use unlabeled data (or arbitrarily labeled data in this case) for this initial training of the ensemble members allows much more data to be used for this training. That is, the number of training data items T may be larger than it otherwise would be if labeled data was required and the number of potential diverse target objectives grows exponentially with T. In some embodiments, the training set for training an ensemble member may be much larger than the training set for training to the shared objective of the ensemble (205 in FIG. 2) because the data for training an ensemble member to a detector target does not need to be labeled for the shared objective 205.

In some aspects, for the purposes of diversity, each ensemble member can have at least one output detector node, such as those described above. In some aspects, either for computational efficiency or for a beneficial regularization effect, there may be a plurality of such output detector nodes in a single ensemble member. However, the amount of diversity achieved by the ensemble depends primarily on the total set of output detector nodes and their respective target sets and not on how those detector nodes are distributed among the ensemble members. The system designer is free to choose among many different embodiments and among many different architectures for individual ensemble members so that the designer can satisfy other objectives without significantly affecting the ability of the ensemble to meet the objective selected in step 101. From these examples, it is clear that enough diverse objectives may be chosen even for a very large ensemble.

In step 103, the computer system 300 can also initialize the machine learning system for the ensemble member specified in step 102. The computer system 300 may use any method for initializing whatever type of machine learning system is to be used for a selected ensemble member. In some embodiments, the ensemble may comprise multiple types of machine learning systems. On the other hand, in some embodiments all ensemble members may be of the same type. Furthermore, if each ensemble member is, for example, a neural network, in some embodiments all ensemble members may have networks with identical architectures, that is, the same number of layers, the same number of nodes in each layer, and the same directed arc connections. Such an embodiment may be preferred for an implementation of graphics processing units (GPUs) or other parallel processors, since it may be possible to run the processing for each ensemble member in parallel with a single instruction stream with multiple data items (SIMD). The connection weights and node biases may have different values in different ensemble members and, in any case, may train to different values.

In the case of a neural network ensemble member, the computer system 300 may initialize the connection weights, for example, by choosing each connection weight in each ensemble member with an independent random sample selected from a Gaussian distribution with a mean of zero and a standard deviation that is proportional to the reciprocal of the square root of the number of incoming directed arcs for the destination node of the directed arc associated with the connection weight. This method of initializing the weights in a neural network is well-known to those skilled in the art of training neural networks. The node biases may be initialized, for example, by setting them all to zero.

Figure 6:
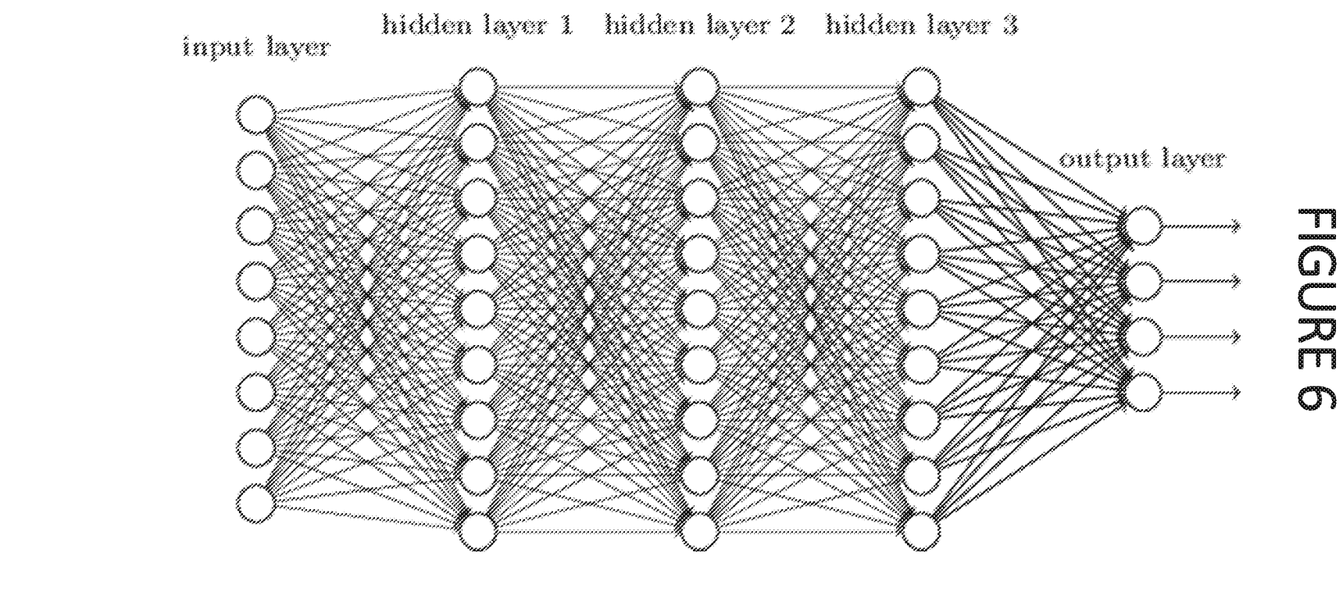
FIG. 6 is a diagram of a neural network such as may be used in various aspects in various embodiments of the invention.

An example of a feed-forward neural network is shown in FIG. 6. A neural network comprises a set of nodes and a set of directed arcs. A feed-forward neural network comprises an input layer, an output layer, and zero or more inner layers. An inner layer may also be called a "hidden" layer. FIG. 6 shows a neural network with an input layer, and output layer, and three hidden layers. Each directed arc connects a node in a lower layer, called its source node, to a node in a higher layer, called its destination node. Each node, except perhaps nodes in the input layer, is associated with a numerical value called the "bias" of the node. Each directed arc is associated with a numerical value called its "connection weight." The connection weights and node biases are called "learned" parameters. During training of a neural network, the values of the learned parameters are iteratively adjusted in an attempt to optimize a specified objective. Other parameters that are used to control the training process are called "hyperparameters."

In step 104, the computer system 300 trains the ensemble member specified in step 102 by any standard method for training the type of machine learning system that is associated with the ensemble member. For example, if the ensemble member is a neural network, it may be trained by an iterative process called stochastic gradient descent based on minibatches using feed-forward activations and back propagation of estimates of the partial derivatives of the objective. Stochastic gradient descent is an iterative process in which the learned parameters (the connection weights and node biases in the case of a neural network) are repeatedly updated by small steps in the direction of the negative of the estimated gradient (in the case of an objective that is to be minimized, as is typical for a classification problem). The process of training a neural network by stochastic gradient descent is well-known to those skilled in the art of training neural networks.

In step 105, the computer system 300 creates a joint optimization network 204, such as illustrated in FIG. 2, so that the ensemble may be trained to the shared objective selected in step 101, despite each ensemble member having a distinct individual objective. The combining network may be a neural network, even if some or all ensemble members are machine learning systems of a type different from a neural network.

Figure 4:
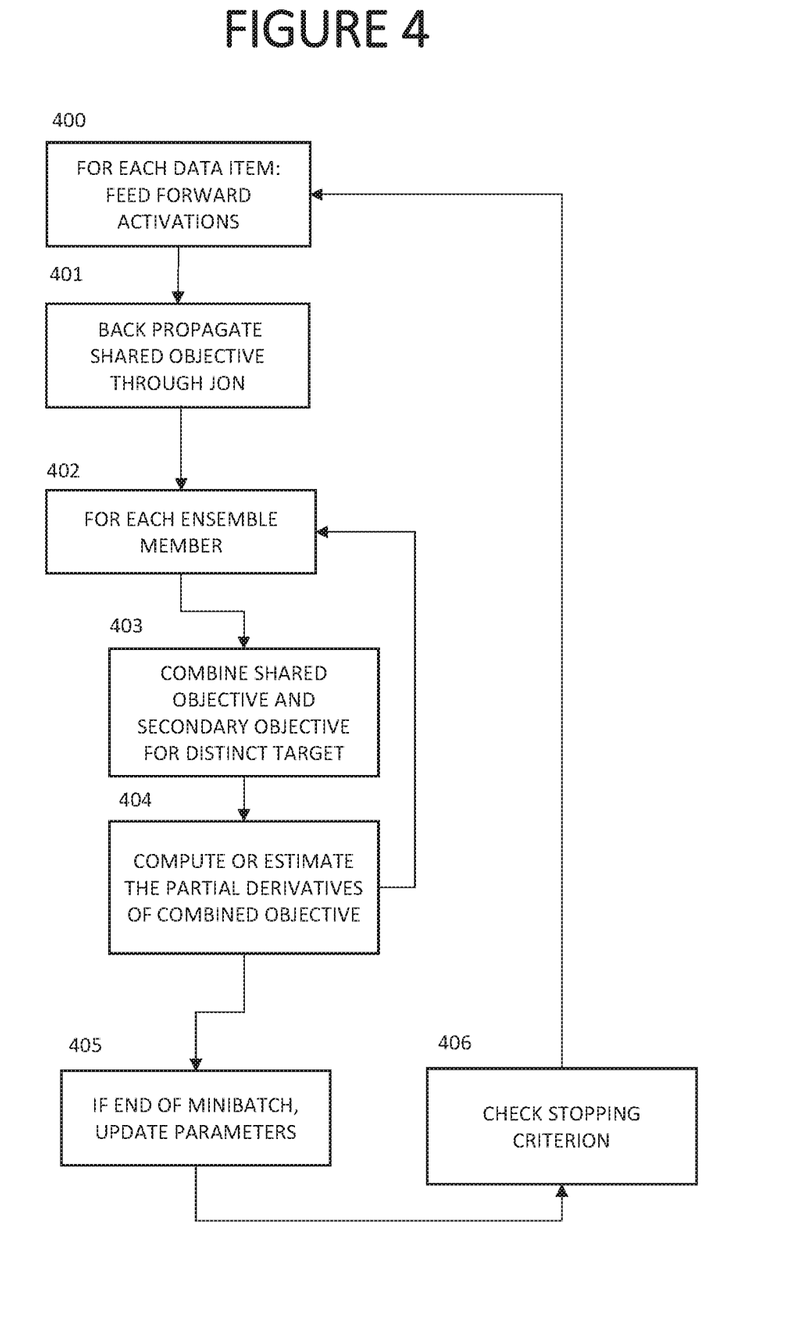
FIG. 4 is a flowchart of an illustrative embodiment of an aspect of the invention that may be used in various embodiments of the invention.

In step 106, the computer system 300 performs joint optimization training, as explained in more detail in association with FIGS. 2 and 4. Preferably, during joint optimization training, each ensemble member is trained with its distinct objective as a secondary objective as well as being trained with the shared objective as its primary objective, computed by way of back propagation from the combining network.

FIG. 2 shows an illustrative aspect of an ensemble with a joint optimization network 204. In this illustrative embodiment, the ensemble members 202A, 202B, 202C share the same input 210. In other aspects, the ensemble members may have different input data from each other, for example, an ensemble member 202A, 202B, 202C may receive input data projected to particular subspace. In one aspect, the ensemble members 202A, 202B, 202C, the joint optimization network 204, and their associated components (e.g., input 210 or objectives 203A, 203B, 203C, 205) can be stored within and executed from one or more memories of the computer system 300.

In the depicted embodiment, three ensemble members 202A, 202B, 202C are shown; however, this is simply for illustrative purposes and the depicted ensemble members 202A, 202B, 202C can represent an arbitrary number of ensemble members. Each ensemble member 202A, 202B, 202C is connected to (i.e., trained on) its own respective individual objective 203A, 203B, 203C. An aspect of this invention is that a number of ensemble members potentially up to an exponential of the number of training data items may each be given distinct objectives.

Each ensemble member 202A, 202B, 202C is also connected to the input of joint optimization network 204. In an illustrative embodiment, the input vector for the joint optimization network 204 is the concatenation of the output vectors of all ensemble members 202A, 202B, 202C.

The connections from each ensemble member 202A, 202B, 202C to its individual objective 203A, 203B, 203C and to joint optimization network 204 implies that each ensemble member 202A, 202B, 202C also receives back propagation of partial derivatives from both its individual objective 203A, 203B, 203C and from the joint optimization network 204.

In some embodiments, the joint optimization network 204 may be trained to optimize the shared objective for the ensemble as selected in step 101 of FIG. 1, without the training making changes to any of the ensemble members 202A, 202B, 202C. In some prior art references, a similar training process might be called "joint optimization." However, there is an important distinction in the meaning of the phrase "joint optimization network" as it is used herein. In an embodiment in which there is no change in any of the ensemble members 202A, 202B, 202C during the training of the joint optimization network 204, the joint optimization network 204 is merely called herein an "optimized combining network," not a "joint optimization network (JON)."

In preferred embodiments, the training of the joint optimization network 204 also back propagates partial derivatives of the shared joint objective 205 to the output of one or more of the ensemble networks 202A, 202B, 202C. The ensemble members 202A, 202B, 202C are then trained based on the back propagation of the shared objective, as well as the ensemble members' 202A, 202B, 202C individual objectives 203A, 203B, 203C. When the network 204 back propagates the shared objective 205 to one or more ensemble members 202A, 202B, 202C, the joint optimization network 204 is called a "joint optimization network (JON)," and not simply an "optimized combining network."

In these preferred embodiments, the joint training of the ensemble members 202A, 202B, 202C based on the shared objective 205 facilitates the training of ensemble members 202A, 202B, 202C to coordinate in meeting the shared objective 205, despite their diverse additional individual objectives 203A, 203B, 203C. Many ensemble building methods incrementally train new ensemble members to optimize a shared objective given the capabilities of the existing ensemble methods. Accordingly, such ensemble building methods train the new ensemble members to complement the previous ensemble members by adding to their strengths and overcoming their weakness. However, these methods do not retrain the previous ensemble members to complement the new ensemble members. In contrast, the back propagation from the joint optimization network 204 trains every ensemble member 202A, 202B, 202C to be complementary to every other ensemble member 202A, 202B, 202C, regardless of whether they are new or old ensemble members. This property of the joint ensemble training allows the initial training and secondary objective 203A, 203B, 203C of each individual ensemble member 202A, 202B, 202C to be a diverse objective that may be unrelated to the joint objective 205. All of the ensemble members 202A, 202B, 202C get trained to the shared objective 205 at once, in parallel and in coordination.

In one aspect, the joint optimization network 204 is a neural network. In aspects where the joint optimization network 204 is a neural network, the computer system 300 performs back propagation of the partial derivatives of the shared objective 205, which is a computation that is well-known to those skilled in the art of training neural networks.

In some embodiments, an ensemble member 202A, 202B, 202C is not necessarily a neural network. Even in such an embodiment, an ensemble member 202A, 202B, 202C that is not a neural network can still be trained based on the shared objective 205, as well as on its individual objective 203A, 203B, 203C. Such a training process is described in more detail in association with FIG. 4.

FIG. 3 is a diagram of a computer system 300 that could be used to implement the embodiments described above, such as the process described in FIG. 1. The illustrated computer system 300 comprises multiple processor units 302A-B that each comprise, in the illustrated embodiment, multiple (N) sets of processor cores 304A-N. Each processor unit 302A-B may comprise on-board memory (ROM or RAM) (not shown) and offboard memory 306A-B. The on-board memory may comprise primary, volatile and/or nonvolatile, storage (e.g., storage directly accessible by the processor cores 304A-N). The offboard memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement ensemble member 202A and the second processor unit 302B may implement ensemble member 202B. As another example, another multiple processor unit 302C may implement joint optimization network 204. Further, different sets of cores in the first processor unit 302A may be responsible for different subnetworks in the neural network or different ensemble members. One or more host processors 310 may coordinate and control the processor units 302A-B.

In other embodiments, the system 300 could be implemented with one processor unit. In embodiments where there are multiple processor units 304A-N, the processor units 304A-N could be co-located or distributed. For example, the processor units 304A-N may be interconnected by data networks, such as a LAN, WAN, the Internet, etc., using suitable wired and/or wireless data communication links. Data may be shared between the various processing units 304A-N using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

FIG. 4 shows in more detail an illustrative embodiment of the training process of the system illustrated in FIG. 2. As is described in connection with FIG. 1, the process illustrated in FIG. 4 can likewise be executed by a computer system, such as the computer system 300 in FIG. 3, in various embodiments.

In step 400, the computer system 300 begins a loop running through steps 400 to 406 for all of the training data. The computer system 300 loops through all the data multiple times, with each pass through the data called an epoch. In step 400, the computer system 300 also computes the feed-forward activations for all the ensemble members, such as the ensemble members 202A, 202B, 202C depicted in FIG. 2, and the feed-forward activations for the joint optimization network 204 for a training data item.

In step 401, the computer system 300 back propagates the partial derivatives of the shared objective 205 back through the joint optimization network 204 for the current training data item.

In step 402, the computer system 300 controls the loop from steps 402 to 404, with one pass through the loop for each ensemble member. The instances of the loop from steps 402 to 404 may be executed sequentially or in parallel.

In step 403, the computer system 300 computes a weighted sum of the partial derivative of the shared objective 205 and the derivative of an individual objective based on a distinct output target for the current ensemble member that was selected in step 103 of FIG. 1. The relative weight of the shared objective compared to the individual objective of an ensemble member may be controlled by a hyperparameter. For example, the shared objective can have a different learning rate than the learning rates for an individual objective. In some embodiments, the relative weight of an individual objective may be reduced as the training progresses, e.g., reduced to zero as the training of the ensemble member nears convergence.

In step 404, the computer system 300 estimates a term to be accumulated over a minibatch for the update of each learned parameter. If the ensemble member machine learning system is a neural network, the computer system estimates this update term by back propagating the derivative of the weighted sum of partial derivatives computed in step 403.

If the machine learning system is not a neural network, in step 404 the computer system 300 may use one of various alternative procedures to estimate partial derivatives of the combined objective. In one aspect, the computer system 300 performs a one-step, on-line training of an ensemble member, rather than minibatch based stochastic gradient descent. In one-step, on-line training, the computer system 300 updates the learned parameters after each training data item. In another embodiment, the computer system 300 uses one-step on-line training to accumulate the gradient estimates for a minibatch to implement minibatch based gradient descent. An illustrative process for performing a one-step, on-line training of an ensemble member is illustrated in FIG. 5 and explained in greater detail below.

Figure 5:
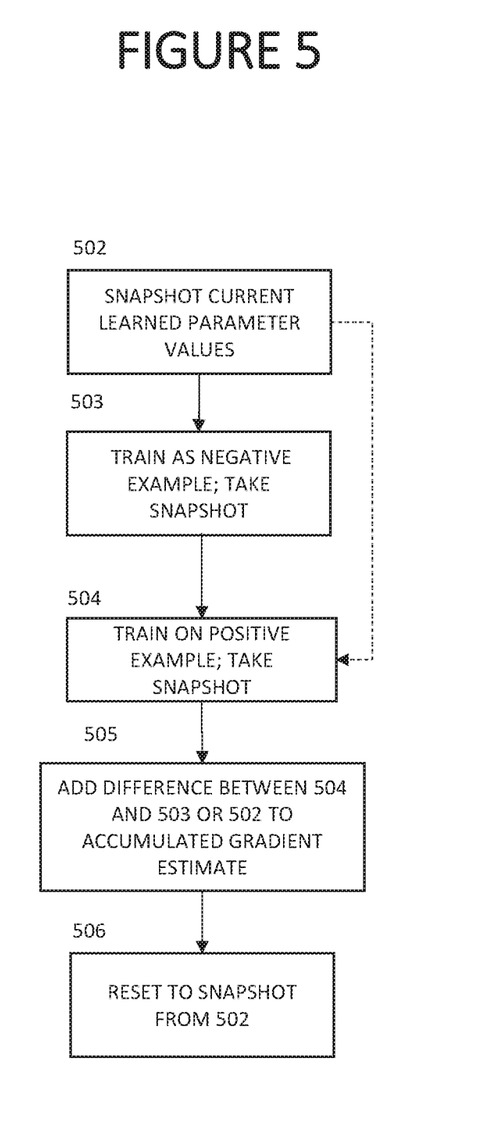
FIG. 5 is a flowchart of an illustrative embodiment of another aspect of the invention that may be used in in various embodiments.

The illustrative embodiment shown in FIG. 5 does not require the machine learning system of the ensemble member specified in step 402 of FIG. 4 to be a neural network. The ensemble member can include, for example, a decision tree, a support vector machine, and other types of machine learning systems. As is described in connection with FIG. 1, the process illustrated in FIG. 5 can likewise be executed by a computer system, such as the computer system 300 in FIG. 3, in various embodiments.

In step 502, the computer system 300 takes a snapshot of (i.e., stores in memory) the current values for the learned parameters. In one aspect, the process illustrated in FIG. 5 proceeds to step 503. In another aspect, the process proceeds to step 504. The aspect where the process includes step 503 is indicated with a solid line to step 503, whereas the aspect where the process does not include step 503 is indicated with a dotted line from step 502 to step 504.

In an aspect in which step 503 is not skipped, the computer system 300 executes both step 503 and step 504 to estimate the partial derivatives by evaluating the output for two slightly changed versions of the machine learning system. Namely, the computer systems 300 evaluates the output of a version of the machine learning system trained by one on-line update using a positive example (in step 504) and a version of the machine learning system trained by one on-line update using a negative example (in step 503). This estimate of the partial derivatives is similar to estimating the derivative of a function of one variable f(x) by the formula $df(x)/dx \cong (f(x+\Delta)-f(x-\Delta))/2$, where $\Delta$ is small.

In step 503, the computer system 300 performs one-step, on-line learning using the current data item as a negative example. This step requires that the objective be based on a set of target values such that each target value has an opposite value that represents what is herein called a "negative example." For example, for an output node with the sigmoid activation function, the opposite of a target value of 1 is a target value of 0 and vice versa. For an output node with the tanh(x) activation function, the opposite of a target value of 1 is −1 and vice versa. For a tanh(x) activation function the opposite value of a target value of 0 is 0, that is, there is no change in a value of 0 for a negative example of a tanh(x) output node. In step 503, the computer system performs an on-line update with the current data item converted to its negative example. This update is akin to evaluating $f(x-\Delta)$.

In step 504, the computer system 300 performs one-step, on-line learning using the current data item as a normal, positive example. This update is akin to evaluating $f(x+\Delta)$. In an embodiment where the computer system 300 has performed step 503, it first resets the learned parameters of the machine learning system to the values in the snapshot made in step 502 before performing the one-step, on-line learning in step 504.

In step 505, the computer system 300 adds a one-data-item estimate of the gradient to the estimate of the gradient being accumulated for the minibatch. The one-data-item estimate of the gradient is the vector of values of the learned parameters from step 504 minus the vector of values of the learned parameters from either (i) the snapshot made in step 503, if step 503 was not skipped, or (ii) the values of the learned parameters from the snapshot made in step 502, if step 503 was skipped. If step 503 was not skipped, the difference in value is divided by two to get the one-data-item estimate of the gradient.

In step 506, the computer system 300 resets the values of the learned parameters to the snapshot made in step 502. In embodiments where the process illustrated in FIG. 5 is being performed in association with step 404 of the process illustrated in FIG. 4, the computer system proceeds to step 405 after completion of step 506.

Returning to FIG. 4, in step 405, if the current data item completes a minibatch, the computer system 300 updates the learned parameters based on the estimated gradient accumulated during the minibatch. The learned parameters in the joint optimization network 204 are updated from the estimated gradient of the shared, joint objective 205 of FIG. 2. The learned parameters in an ensemble member (e.g., ensemble members 202A, 202B, 202C in FIG. 2) are updated based on a weighted average of the estimate of the gradient of the joint objective 205 and the estimate of the gradient of the individual objective of the ensemble member, as explained in association with step 403.

In step 406, the computer system 300 checks a stopping criterion. A stopping criterion may comprise (i) that the training process appears to have converged, (ii) that the performance on validation data has degraded by more than a specified amount, or (iii) that a specified number of epochs have been processed. If no stopping criterion is satisfied, control returns to step 400 for multiple minibatches until an epoch is completed and then continues with more minibatches for the next epoch.

Unless specifically stated otherwise as apparent from the foregoing disclosure, it is appreciated that, throughout the foregoing disclosure, discussions using terms such as "computing," "calculating," "determining," "selecting," "training," or the like, refer to the action and processes of a computer system (e.g., the computer system 300 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

Based on the above description, it is clear that embodiments of the present invention can be used to improve many different types of machine learning systems, particularly neural networks. For example, embodiments of the present invention can improve recommender systems, speech recognition systems, and classification systems, including image and diagnostic classification systems, to name but a few examples.

Various aspects of the subject matter described herein are set out in the following aspects, implementations, and/or examples, which can be interchangeably combined together in various combinations:

In one general aspect, a computer-implemented method of training an ensemble machine learning system comprising a plurality of ensemble members, the method comprising: (i) training, by a computer system, individually the plurality of ensemble members on a training data set, wherein each of the plurality of ensemble members is trained according to an associated objective for the ensemble member; and (ii) after training the plurality of ensemble members, training, by the computer system, a consolidated machine learning system, wherein: (a) the consolidated machine learning system comprises the plurality of ensemble members and a joint optimization machine learning system, such that an output from each of the plurality of ensemble members is input to the joint optimization machine learning system; (b) the joint optimization machine learning system is trained according to a shared objective; and (c) each of the plurality of ensemble members is trained according to both the shared objective and the associated objective for the plurality of ensemble members.

In one aspect, the associated objective for each of the plurality of ensemble members is unique.

In one aspect, each of the plurality of ensemble members comprises an output detector node; and the associated objective comprises a subset of the training data set as a target for each output detector node.

In one aspect, each of the plurality of ensemble members comprises an output detector node; the training data set comprises a first subset and a second subset that is disjoint from the first subset; and the associated objective comprises: a first value for the output detector node when a training data item falls within the first subset of the training data set; and a second value for the output detector node when the training data item falls within the second subset of the training data set.

In one aspect, training the consolidated machine learning system comprises: computing, by the computer system, feed-forward activations for each of the plurality of ensemble members for a training data item from a training data set; computing, by the computer system, feed-forward activations for the joint optimization machine learning system for the training data item; back propagating, by the computer system, partial derivatives of the shared objective through the joint optimization machine learning system; computing, by the computer system, a weighted sum of the partial derivatives of the shared objective and a derivative of the associated objective for each of the plurality of ensemble members; estimating, by the computer system, an update term for each of the plurality of ensemble members according to the weighted sum; and updating, by the computer system, learned parameters of each of the plurality of ensemble members according to the update term.

In one aspect, estimating the update term comprises: back propagating, by the computer system, a derivative of the weighted sum through each of the plurality of ensemble members.

In one aspect, estimating the update term comprises: storing, by the computer system, current values of learned parameters of each of the plurality of ensemble members as stored values; determining, by the computer system, updated values of the learned parameters of each of the plurality of ensemble members for the training data item being a positive example; adding, by the computer system, a difference between the stored values and the updated values of the learned parameters to an accumulated gradient estimate for the training data set; and resetting, by the computer system, the learned parameters to the stored values.

In one aspect, estimating the update term comprises: storing, by the computer system, current values of learned parameters of each of the plurality of ensemble members as stored values; determining, by the computer system, first updated values of the learned parameters of each of the plurality of ensemble members for the training data item being a negative example; resetting, by the computer system, the learned parameters to the stored values; determining, by the computer system, second updated values of the learned parameters of each of the plurality of ensemble members for the training data item being a positive example; adding, by the computer system, an averaged difference between the first updated values and the second updated values of the learned parameters to an accumulated gradient estimate for the training data set; and resetting, by the computer system, the learned parameters to the stored values.

In one aspect, the weighted sum comprises a weight applied to the partial derivatives of the shared objective relative to the derivative of the associated objective for each of the plurality of ensemble members.

In one aspect, the method further comprises: controlling, by the computer system, the weight according to a training progress of each of the plurality of ensemble members.

In one aspect, controlling the weight according to the training progress of each of the plurality of ensemble members comprises: reducing, by the computer system, the weight as each of the plurality of ensemble members reaches convergence.

In one aspect, the plurality of ensemble members comprises a plurality of different machine learning system types.

In one aspect, the plurality of ensemble members comprises a single machine learning system type.

In one aspect, the single machine learning system type comprises a neural network.

In one aspect, each neural network comprises a same number of layers, a same number of nodes within each of the layers, and a same arrangement of directed arc connections between the nodes.

In one aspect, a computer system comprises a processor and a memory coupled to the processor, the memory storing a plurality of ensemble members, a joint optimization machine learning system, and instructions that, when executed by the processor, cause the computer system to execute the method(s) enumerated above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method of training an ensemble machine learning system comprising an ensemble, wherein the ensemble comprises a plurality of ensemble members, the method comprising:
    training, by a computer system, individually the plurality of ensemble members on a training data set, wherein each of the plurality of ensemble members is trained according to an associated objective for the ensemble member; and
    after training the plurality of ensemble members, training, by the computer system, a consolidated machine learning system, wherein:
        the consolidated machine learning system comprises the plurality of ensemble members and a joint optimization machine learning system, such that an output from each of the plurality of ensemble members is input to the joint optimization machine learning system;
        the joint optimization machine learning system is trained to optimize a shared objective for the ensemble; and
        each of the plurality of ensemble members is trained according to both the shared objective for the ensemble and the associated objective for the ensemble member, such that, in the training of the consolidated machine learning system, partial derivatives of the shared objective from the joint optimization machine learning system are back-propagated to the outputs of the plurality of ensemble members.

2. The computer-implemented method of claim 1, wherein the associated objective for each of the plurality of ensemble members is unique.

3. The computer-implemented method of claim 1, wherein:
    each of the plurality of ensemble members comprises an output detector node; and
    the associated objective comprises a subset of the training data set as a target for each output detector node.

4. The computer-implemented method of claim 1, wherein:
    each of the plurality of ensemble members comprises an output detector node;

the training data set comprises a first subset and a second subset that is disjoint from the first subset; and
the associated objective comprises:
a first value for the output detector node when a training data item falls within the first subset of the training data set; and
a second value for the output detector node when the training data item falls within the second subset of the training data set.

5. The computer-implemented method of claim 1, wherein training the consolidated machine learning system comprises:
computing, by the computer system, feed-forward activations for each of the plurality of ensemble members for a training data item from a training data set;
computing, by the computer system, feed-forward activations for the joint optimization machine learning system for the training data item;
back propagating, by the computer system, partial derivatives of the shared objective through the joint optimization machine learning system;
computing, by the computer system, a weighted sum of the partial derivatives of the shared objective and a derivative of the associated objective for each of the plurality of ensemble members;
estimating, by the computer system, an update term for each of the plurality of ensemble members according to the weighted sum; and
updating, by the computer system, learned parameters of each of the plurality of ensemble members according to the update term.

6. The computer-implemented method of claim 5, wherein estimating the update term comprises:
back propagating, by the computer system, a derivative of the weighted sum through each of the plurality of ensemble members.

7. The computer-implemented method of claim 5, wherein estimating the update term comprises:
storing, by the computer system, current values of learned parameters of each of the plurality of ensemble members as stored values;
determining, by the computer system, updated values of the learned parameters of each of the plurality of ensemble members for a positive-example training data item;
adding, by the computer system, a difference between the stored values and the updated values of the learned parameters to an accumulated gradient estimate for the training data set; and
resetting, by the computer system, the learned parameters to the stored values.

8. The computer-implemented method of claim 5, wherein estimating the update term comprises:
storing, by the computer system, current values of learned parameters of each of the plurality of ensemble members as stored values;
determining, by the computer system, first updated values of the learned parameters of each of the plurality of ensemble members for a negative-example training data item;
resetting, by the computer system, the learned parameters to the stored values;
determining, by the computer system, second updated values of the learned parameters of each of the plurality of ensemble members for a positive-example training data item;
adding, by the computer system, an averaged difference between the first updated values and the second updated values of the learned parameters to an accumulated gradient estimate for the training data set; and
resetting, by the computer system, the learned parameters to the stored values.

9. The computer-implemented method of claim 5, wherein the weighted sum comprises a weight applied to the partial derivatives of the shared objective relative to the derivative of the associated objective for each of the plurality of ensemble members.

10. The computer-implemented method of claim 9, further comprising:
controlling, by the computer system, the weight according to a training progress of each of the plurality of ensemble members.

11. The computer-implemented method of claim 10, wherein controlling the weight according to the training progress of each of the plurality of ensemble members comprises:
reducing, by the computer system, the weight as each of the plurality of ensemble members reaches convergence.

12. The computer-implemented method of claim 1, wherein the plurality of ensemble members comprises a plurality of different machine learning system types.

13. The computer-implemented method of claim 1, wherein the plurality of ensemble members comprises a single machine learning system type.

14. The computer-implemented method of claim 13, wherein the single machine learning system type comprises a neural network.

15. The computer-implemented method of claim 14, wherein each neural network comprises a same number of layers, a same number of nodes within each of the layers, and a same arrangement of directed arc connections between the nodes.

16. A computer system for training an ensemble machine learning system comprising an ensemble, wherein the ensemble comprises a plurality of ensemble members, the computer system comprising:
a processor; and
a memory coupled to the processor, the memory storing:
the plurality of ensemble members;
a joint optimization machine learning system; and
instructions that, when executed by the processor, cause the computer system to:
train individually the plurality of ensemble members on a training data set, wherein each of the plurality of ensemble members is trained according to an associated objective for the ensemble member; and
after training the plurality of ensemble members, train a consolidated machine learning system, wherein:
the consolidated machine learning system comprises the plurality of ensemble members and the joint optimization machine learning system, such that an output from each of the plurality of ensemble members is input to the joint optimization machine learning system;
the joint optimization machine learning system is trained according to a shared objective; and
each of the plurality of ensemble members is trained according to both the shared objective and the associated objective for the ensemble member such that, in the training of the consolidated machine learning system, partial derivatives of the shared objective from the joint optimization machine learning system are back-propagated to the outputs of the plurality of ensemble members.

17. The computer system of claim 16, wherein the associated objective for each of the plurality of ensemble members is unique.

18. The computer system of claim 16, wherein:
each of the plurality of ensemble members comprises an output detector node; and
the associated objective comprises a subset of the training data set as a target for each output detector node.

19. The computer system of claim 16, wherein:
each of the plurality of ensemble members comprises an output detector node;
the training data set comprises a first subset and a second subset that is disjoint from the first subset; and
the associated objective comprises:
a first value for the output detector node when a training data item falls within the first subset of the training data set; and
a second value for the output detector node when the training data item falls within the second subset of the training data set.

20. The computer system of claim 16, wherein the instructions cause the computer system to train the consolidated machine learning system by causing the computer system to:
compute feed-forward activations for each of the plurality of ensemble members for a training data item from a training data set;
compute feed-forward activations for the joint optimization machine learning system for the training data item;
back propagate partial derivatives of the shared objective through the joint optimization machine learning system;
compute a weighted sum of the partial derivatives of the shared objective and a derivative of the associated objective for each of the plurality of ensemble members;
estimate an update term for each of the plurality of ensemble members according to the weighted sum; and
update learned parameters of each of the plurality of ensemble members according to the update term.

21. The computer system of claim 20, wherein the instructions cause the computer system to estimate the update term by causing the computer system to:
back propagate a derivative of the weighted sum through each of the plurality of ensemble members.

22. The computer system of claim 20, wherein the instructions cause the computer system to estimate the update term by causing the computer system to:
store current values of learned parameters of each of the plurality of ensemble members as stored values;
determine updated values of the learned parameters of each of the plurality of ensemble members for a positive-example training data item;
add a difference between the stored values and the updated values of the learned parameters to an accumulated gradient estimate for the training data set; and
reset the learned parameters to the stored values.

23. The computer system of claim 20, wherein the instructions cause the computer system to estimate the update term by causing the computer system to:
store current values of learned parameters of each of the plurality of ensemble members as stored values;
determine first updated values of the learned parameters of each of the plurality of ensemble members for a negative-example training data item;
reset the learned parameters to the stored values;
determine second updated values of the learned parameters of each of the plurality of ensemble members for a positive-example training data item;
add an averaged difference between the first updated values and the second updated values of the learned parameters to an accumulated gradient estimate for the training data set; and
reset the learned parameters to the stored values.

24. The computer system of claim 20, wherein the weighted sum comprises a weight applied to the partial derivatives of the shared objective relative to the derivative of the associated objective for each of the plurality of ensemble members.

25. The computer system of claim 24, wherein the instructions further cause the computer system to:
control the weight according to a training progress of each of the plurality of ensemble members.

26. The computer system of claim 25, wherein the instructions cause the computer system to control the weight according to the training progress of each of the plurality of ensemble members by causing the computer system to:
reduce the weight as each of the plurality of ensemble members reaches convergence.

27. The computer system of claim 16, wherein the plurality of ensemble members comprises a plurality of different machine learning system types.

28. The computer system of claim 16, wherein the plurality of ensemble members comprises a single machine learning system type.

29. The computer system of claim 28, wherein the single machine learning system type comprises a neural network.

30. The computer system of claim 29, wherein each neural network comprises a same number of layers, a same number of nodes within each of the layers, and a same arrangement of directed arc connections between the nodes.

* * * * *